United States Patent
Fahlbusch (10) Patent No.: US 11,664,659 B2
(45) Date of Patent: May 30, 2023

(54) POLARITY-REVERSAL PROTECTION ARRANGEMENT, METHOD FOR OPERATING THE POLARITY-REVERSAL-PROTECTION ARRANGEMENT AND CORRESPONDING USE

(71) Applicant: Continental Teves AG & Co. OHG, Frankfurt am Main (DE)

(72) Inventor: Thorsten Fahlbusch, Frankfurt am Main (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 77 days.

(21) Appl. No.: 16/864,781

(22) Filed: May 1, 2020

(65) Prior Publication Data

US 2020/0259327 A1    Aug. 13, 2020

Related U.S. Application Data

(63) Continuation of application No. PCT/EP2018/078868, filed on Oct. 22, 2018.

(30) Foreign Application Priority Data

Nov. 3, 2017 (DE) .................... 10 2017 219 551.7

(51) Int. Cl.
*H02H 11/00* (2006.01)
*B60R 16/03* (2006.01)
(Continued)

(52) U.S. Cl.
CPC .......... *H02H 11/003* (2013.01); *B60R 16/03* (2013.01); *G05F 1/461* (2013.01); *H02H 3/044* (2013.01); *H02H 3/18* (2013.01)

(58) Field of Classification Search
CPC ............................ H02H 11/003; H02H 1/06
(Continued)

(56) References Cited

U.S. PATENT DOCUMENTS 4,029,971 A * 6/1977 Pryor ...................... H03K 3/29
326/56
4,747,009 A * 5/1988 Gillett .................... H01H 47/26
361/165

(Continued)

FOREIGN PATENT DOCUMENTS

CN          1463078 A       12/2003
CN          103390883 A     11/2013
(Continued)

OTHER PUBLICATIONS

Thomas Schaerer "Tristate-Logik, Grundlage und Praxis", http://www.elektronik-kompendium.de, 2001.
(Continued)

*Primary Examiner* — Thienvu V Tran
*Assistant Examiner* — Nusrat Quddus (57) ABSTRACT

A polarity reversal protection arrangement having a transistor circuit, an amplifier circuit and an output driver stage, wherein the amplifier circuit is connected to the output driver stage and the output driver stage is connected to the transistor circuit and the transistor circuit is arranged between a first connection node and a second connection node of the polarity reversal protection arrangement, such that an electrical connection between the first connection node and the second connection node is able to be created or disconnected by way of the transistor circuit, wherein the output driver stage is designed as a tri-state stage. A method for operating the polarity reversal protection arrangement and to a corresponding use.

12 Claims, 4 Drawing Sheets

(51) Int. Cl.
  *G05F 1/46* (2006.01)
  *H02H 3/04* (2006.01)
  *H02H 3/18* (2006.01)
(58) Field of Classification Search
  USPC .................................. 323/271–289
  See application file for complete search history.

(56) References Cited

U.S. PATENT DOCUMENTS

| | | | | |
|---|---|---|---|---|
| 5,159,216 A | * | 10/1992 | Taylor | H03K 5/08 |
| | | | | 326/30 |
| 5,231,318 A | * | 7/1993 | Reddy | G11C 7/062 |
| | | | | 326/56 |
| 5,422,591 A | * | 6/1995 | Rastegar | G05F 3/24 |
| | | | | 327/537 |
| 5,430,404 A | * | 7/1995 | Campbell | H01L 27/11898 |
| | | | | 257/E27.11 |
| 5,440,441 A | * | 8/1995 | Ahuja | H02H 3/06 |
| | | | | 361/62 |
| 5,570,043 A | * | 10/1996 | Churchill | H03K 19/00315 |
| | | | | 326/21 |
| 5,592,119 A | * | 1/1997 | Yoo | G05F 3/247 |
| | | | | 327/535 |
| 5,959,494 A | * | 9/1999 | Fotouhi | H03K 17/302 |
| | | | | 327/427 |
| 6,498,737 B1 | * | 12/2002 | Kuo | G05F 3/242 |
| | | | | 363/59 |
| 6,518,731 B2 | * | 2/2003 | Thomas | H02J 7/0029 |
| | | | | 320/136 |
| 6,909,585 B2 | * | 6/2005 | Broulim | H02H 11/003 |
| | | | | 307/127 |
| 7,365,951 B2 | * | 4/2008 | Sun | H05B 41/2983 |
| | | | | 315/291 |
| 7,378,878 B2 | * | 5/2008 | Major | H03K 17/163 |
| | | | | 327/170 |
| 8,009,452 B1 | * | 8/2011 | Sadwick | H02M 3/335 |
| | | | | 363/149 |
| 8,537,517 B1 | * | 9/2013 | Banak | H02H 11/002 |
| | | | | 361/93.1 |
| 8,582,259 B2 | * | 11/2013 | Murakami | H03K 17/0822 |
| | | | | 361/56 |
| 8,619,445 B1 | * | 12/2013 | Low | H02M 3/073 |
| | | | | 363/59 |
| 8,638,130 B1 | * | 1/2014 | Olsen | G11C 7/1084 |
| | | | | 327/108 |
| 8,766,675 B1 | * | 7/2014 | Dreps | H02H 9/041 |
| | | | | 327/309 |
| 8,963,581 B1 | * | 2/2015 | Lewis | H03K 19/0944 |
| | | | | 326/40 |
| 9,054,517 B1 | * | 6/2015 | Zhu | H02H 11/003 |
| 9,270,255 B2 | * | 2/2016 | Kwon | H03K 17/687 |
| 9,866,009 B2 | * | 1/2018 | Oka | H02H 3/087 |
| 9,871,029 B2 | * | 1/2018 | Twomey | H01L 29/7816 |
| 9,954,548 B2 | * | 4/2018 | Illing | H02H 3/093 |
| 10,128,833 B2 | * | 11/2018 | Nilles | H02M 3/07 |
| 10,394,260 B2 | * | 8/2019 | Shen | H03K 19/017509 |
| 10,483,757 B1 | * | 11/2019 | Banak | H02H 9/025 |
| 10,770,883 B2 | * | 9/2020 | Creech | H02H 3/085 |
| 2003/0222679 A1 | | 12/2003 | Morikawa | |
| 2004/0052022 A1 | * | 3/2004 | Laraia | H01L 27/0285 |
| | | | | 361/91.1 |
| 2004/0119526 A1 | * | 6/2004 | Ajit | H03K 19/00315 |
| | | | | 327/536 |
| 2004/0145407 A1 | * | 7/2004 | Shirasawa | H03K 17/162 |
| | | | | 327/434 |
| 2004/0233009 A1 | * | 11/2004 | Eckert | H03C 3/0958 |
| | | | | 331/177 V |
| 2005/0007711 A1 | | 1/2005 | Liu et al. | |
| 2007/0063758 A1 | * | 3/2007 | Allard | H03K 19/00315 |
| | | | | 327/333 |
| 2007/0291432 A1 | * | 12/2007 | Ueda | H02H 3/202 |
| | | | | 361/91.1 |
| 2009/0027081 A1 | * | 1/2009 | Kaplun | H03K 19/0948 |
| | | | | 326/58 |
| 2009/0027089 A1 | * | 1/2009 | Hebenstreit | H03K 19/018521 |
| | | | | 327/108 |
| 2009/0322295 A1 | * | 12/2009 | Scoones | G05F 1/56 |
| | | | | 323/282 |
| 2010/0014202 A1 | * | 1/2010 | Forster | H03K 17/08122 |
| | | | | 361/90 |
| 2010/0244930 A1 | * | 9/2010 | Ogawa | H03K 17/163 |
| | | | | 327/437 |
| 2010/0277155 A1 | * | 11/2010 | Taki | H02P 7/29 |
| | | | | 323/299 |
| 2011/0037416 A1 | * | 2/2011 | Nakamura | H05B 41/2886 |
| | | | | 315/307 |
| 2011/0051303 A1 | * | 3/2011 | Migliavacca | H02J 7/00308 |
| | | | | 361/91.5 |
| 2011/0102046 A1 | * | 5/2011 | Kumar | H03K 19/00315 |
| | | | | 327/306 |
| 2011/0133772 A1 | * | 6/2011 | Shau | H03K 19/0008 |
| | | | | 327/108 |
| 2011/0156765 A1 | * | 6/2011 | Kim | H03K 19/018507 |
| | | | | 327/109 |
| 2011/0291707 A1 | * | 12/2011 | Illegems | H03K 17/0822 |
| | | | | 327/108 |
| 2012/0081165 A1 | * | 4/2012 | Huang | H03K 19/018528 |
| | | | | 327/566 |
| 2012/0091985 A1 | * | 4/2012 | Nierop | H03K 17/6874 |
| | | | | 323/311 |
| 2013/0009689 A1 | * | 1/2013 | Santos | H03F 3/217 |
| | | | | 327/392 |
| 2013/0147445 A1 | * | 6/2013 | Levesque | H03F 3/195 |
| | | | | 323/271 |
| 2013/0162029 A1 | | 6/2013 | Reichow et al. | |
| 2013/0235630 A1 | * | 9/2013 | Sadwick | H02M 3/33561 |
| | | | | 29/874 |
| 2014/0268463 A1 | * | 9/2014 | Dreps | H05K 3/303 |
| | | | | 327/437 |
| 2014/0285241 A1 | * | 9/2014 | Umetani | H03K 17/162 |
| | | | | 327/109 |
| 2014/0300413 A1 | * | 10/2014 | Hoyerby | H03F 3/2171 |
| | | | | 327/109 |
| 2015/0207399 A1 | * | 7/2015 | Li | H02M 3/156 |
| | | | | 315/210 |
| 2015/0280701 A1 | * | 10/2015 | Park | H03K 17/6872 |
| | | | | 327/379 |
| 2016/0028302 A1 | * | 1/2016 | Low | H02M 3/073 |
| | | | | 363/50 |
| 2016/0065064 A1 | * | 3/2016 | Zojer | H03K 17/107 |
| | | | | 323/271 |
| 2016/0065203 A1 | * | 3/2016 | Zojer | H02M 1/088 |
| | | | | 327/109 |
| 2016/0105175 A1 | * | 4/2016 | Ishimatsu | H03K 17/162 |
| | | | | 327/109 |
| 2016/0142051 A1 | * | 5/2016 | Chan | H03K 17/6872 |
| | | | | 327/108 |
| 2016/0164402 A1 | | 6/2016 | Hargis | |
| 2018/0175859 A1 | * | 6/2018 | Jansen | G06F 13/4022 |
| 2018/0331093 A1 | * | 11/2018 | Takahashi | H02J 7/0034 |
| 2019/0181859 A1 | * | 6/2019 | Wibben | H03K 17/6871 |
| 2020/0050254 A1 | * | 2/2020 | Lee | H03K 19/0016 |
| 2020/0059085 A1 | * | 2/2020 | Kolli | H02P 27/06 |
| 2020/0076190 A1 | * | 3/2020 | La Rosa | G05F 3/205 |

FOREIGN PATENT DOCUMENTS

| | | | | |
|---|---|---|---|---|
| CN | 204167966 U | | 2/2015 | |
| CN | 105680680 A | | 6/2016 | |
| DE | 10001485 A1 | * | 7/2001 | ........... H02H 11/003 |
| DE | 10048184 A1 | * | 4/2002 | ........... H02H 11/003 |
| DE | 102010011276 A1 | | 9/2011 | |
| DE | 102013223012 A1 | | 5/2015 | |
| DE | 102014218551 A1 | * | 3/2016 | ........... H02H 11/003 |
| KR | 20110132755 A | | 12/2011 | |
| KR | 101638352 | * | 7/2016 | |

(56) References Cited

FOREIGN PATENT DOCUMENTS

| WO | 9813922 A1 | 4/1998 | | |
|---|---|---|---|---|
| WO | 2014205974 A1 | 12/2014 | | |
| WO | WO-2018150789 A1 * | 8/2018 | .............. | H02M 1/08 |

OTHER PUBLICATIONS

Texas Instruments "LM74610-Q1 Smart Diode Controller", SNOSCZI—Feb. 2015, www.ti.com.
Texas Instruments "LM5050-1/LM5050-1-Q1 High Side OR-ing FET Controller", SNVS629D—May 2011—Revised Jun. 2013, www.ti.com.
Linear Technology Corporation "LTC4357—Positive High Voltage Ideal Diode Controller", 2007.
Search Report dated Oct. 19, 2018 from corresponding German Patent Application No. 10 2017 219 551.7.
International Search Report and Written Opinion dated Feb. 26, 2019 from corresponding International Patent Application No. PCT/EP2018/078868.
Chinese Office Action dated Oct. 9, 2021 for the counterpart Chinese Patent Application No. 201880070713.1.
Korean Notice of Preliminary Rejection dated Oct. 20, 2021 for the Korean Patent Application No. 10-2020-7012507.
Search Report dated Apr. 7, 2022 from corresponding Chinese patent application No. 201880070713.1.
Office Action (Translated) dated Apr. 13, 2022 from corresponding Chinese patent application No. 201880070713.1.
Office Action (Original) dated Apr. 13, 2022 from corresponding Chinese patent application No. 201880070713.1.

\* cited by examiner

POLARITY-REVERSAL PROTECTION ARRANGEMENT, METHOD FOR OPERATING THE POLARITY-REVERSAL-PROTECTION ARRANGEMENT AND CORRESPONDING USE

CROSS REFERENCE TO RELATED APPLICATIONS

This application is a continuation application of PCT International Application No. PCT/EP2018/078868, filed Oct. 22, 2018, which claims priority to German Patent Application No. DE 10 2017 219 551.7, filed Nov. 3, 2017, wherein the contents of such applications are incorporated herein by reference.

TECHNICAL FIELD

A polarity reversal protection arrangement.

TECHNICAL BACKGROUND

Conventional control devices for motor vehicles in which a return flow of energy into the on-board power system is prevented in order not to jeopardize the safety of the vehicle. For this purpose, use is made of a transistor that does not allow the return flow at a node point to the on-board power system and protects the electronics of the control device against negative voltages (polarity reversal protection function).

In what is known as the linear mode, the transistor (in particular FET) is driven such that it behaves like an ideal diode. When flowing from the on-board power system, all known interfering pulses are filtered out by disconnecting the connection to the load circuits of the ECU within a very short time. The transistor is controlled via a linear regulation loop, such that a particular drain-source voltage arises at the transistor. This particular voltage is in the region of a threshold voltage of the transistor, such that the transistor is able to quickly change from a switched-on state to a switched-off state and vice versa.

In what is known as the switch mode, a circuit controls the gate of the transistor, wherein the circuit comprises a switch. If the switch is closed, then the transistor is activated and the drain-source resistance is assigned a minimum value. If the switch is open, then the transistor is deactivated and the gate-source voltage of the transistor is brought below the threshold voltage. As is known, the circuit of the switch mode is accompanied by a monitoring circuit that monitors the correct operation of the circuit.

The disadvantages of the conventional applications are as follows:
  It is not possible to combine the two modes.
  Controlled feedback into the on-board power system is not possible.
  There is no self-test/diagnostic function in linear mode.
  Discrete components are used on the circuit board inside the control device.

What is needed is a way to avoid the abovementioned disadvantages and to provide an improved polarity reversal protection arrangement.

BRIEF DESCRIPTION OF THE DRAWINGS

Further preferred embodiments become apparent from the claims and the following description of exemplary embodiments with reference to the figures.

In each case schematically.

DETAILED DESCRIPTION OF THE EMBODIMENTS

A polarity reversal protection arrangement that has a transistor circuit, an amplifier circuit and an output driver stage. In this case, the amplifier stage is connected to the output driver stage and the output driver stage is connected to the transistor circuit. The polarity reversal protection circuit furthermore has a first connection node and a second connection node that are connected to one another via the transistor circuit. The first connection node creates the connection to an on-board power system (what is called the KL30 terminal) and the second connection node creates the connection to one or more control devices (what is called the KL30B terminal). An electrical connection between the first connection node and the second connection node is able to be created or disconnected by way of the transistor circuit. The output driver stage is furthermore designed as a tri-state stage.

The amplifier circuit is designed to carry out the above-mentioned linear mode. The first connection node is connected to the on-board power system of the vehicle.

In the present case, tri-state stage is the name given to a circuit that makes it possible to adopt a high-resistance state. As a result, a further circuit may advantageously be connected to a third connection node between the output driver stage and transistor circuit, which further circuit is able to control the transistor circuit via its gate connection. The output driver stage will not influence or interfere with the operation of the further circuit in this case. This further circuit is designed as a monitoring circuit and/or as a switch circuit. In the case of a switch circuit, it is in particular possible to perform said switch mode. The transistor circuit is able to be driven by the amplifier circuit and the switch circuit via the output driver stage. The transistor circuit is driven at particular times by either respectively the amplifier circuit or the switch circuit via the output driver stage.

In one or more embodiments, the design as a "tri-state stage" may mean that the output driver stage may be designed as any amplifier stage with the possibility of a tri-state mode, for example as a push-pull stage with a tri-state mode.

The embodiments advantageously make it possible to provide both modes and to make them usable. T two modes are operated alternately, such that metered feeding of energy back into the on-board power system is performed. By virtue of metered feedback, a certain safety level of the control device or of the vehicle is able to be guaranteed at all times, taking into account predefined limits. The thermal losses within the control device are therefore able to be reduced, which enables a more compact and more robust product design.

A further advantage is that the pins on the IC housing of an ASIC are able to be used jointly. The proposed interconnection means in particular that fewer pins are required for connection, as a result of which space and resources are able to be saved at this point.

In one or more embodiments, a node point is arranged in the connection between the amplifier circuit and the output driver stage and the polarity reversal protection arrangement has a resistor that is connected to the node point and one of the connection nodes, in particular the connection node to the on-board power system. The resistor makes the polarity reversal protection arrangement more durable by protecting the entire arrangement against "polarity reversal", that is to say ISO pulses, load dump and any type of destructive electrical pulses on the on-board power system. This results in improved robustness of the arrangement against destruction.

In one or more embodiments, the transistor circuit is designed as an N-MOS transistor and the polarity reversal protection arrangement has a charge pump. The charge pump is connected to the output driver stage. As an alternative, the transistor circuit is designed as a P-MOS transistor. In this case, the charge pump may be dispensed with and is optionally not provided.

In one or more embodiments, the polarity reversal protection arrangement has a monitoring circuit by way of which the transistor circuit, the amplifier circuit and/or the switch circuit may be monitored. However, the transistor circuit is monitored.

Use is made in this case of a monitoring circuit that is accommodated in a component together with the switch circuit. The development therefore makes it possible to use the monitoring circuit not only for monitoring the switch circuit but also for the amplifier circuit. This advantageously means that no additional components, such as for example a further monitoring circuit for monitoring the amplifier circuit, are necessary. The monitoring circuit comprises a test function and/or a diagnostic function. By way of example, the circuits may be monitored for faults, for example during ongoing operation. However, predefined tests may also be performed, these giving an indication with regard to faults in the circuits. The data are evaluated, for example by a microprocessor, such that a fault message is able to be output. The fault message is able to be accessed using the diagnostic function or the functions of the monitoring circuit are able to be controlled by way of the diagnostic function.

In one or more embodiments the monitoring circuit is designed to perform further tests or monitoring operations that do not relate to the transistor circuit, the amplifier circuit or the switch circuit.

In one or more embodiments, at least the output driver stage and the amplifier circuit are accommodated together on an ASIC (application-specific integrated circuit). The ASIC is designed as a power component (PCU) that is suitable for energy management of a control unit (ECU) of a vehicle. The ASIC is part of the ECU. The transistor circuit may likewise be accommodated in the ASIC or—as an alternative—in another part of the ECU. The switch circuit is also arranged in the ASIC. Overall, such a design of the polarity reversal protection arrangement makes it possible to reduce costs and the space required in the control unit. In addition, only a minimal surface area on the chip of the ASIC is necessary. As an alternative thereto, the circuits are provided discretely on the circuit board.

In one or more embodiments, at least some of the driver stages (transistors) are designed as metal oxide transistors (CMOS). In particular, all of the driver stages are designed in this way. As an alternative, however, bipolar transistors may also for example be used, or any other amplifier circuit that outputs a high impedance in the switched-off state.

In one or more embodiments the amplifier circuit is designed as an operational amplifier, for example as a comparator. As an alternative, the amplifier circuit may also be used as any other differential structure for signal processing and signal amplification.

A method for operating a polarity reversal protection arrangement described above. The following steps may be performed according to the method:
 a. Driving the transistor circuit by way of the output driver stage based on signals from the amplifier circuit and/or
 b. Driving the transistor circuit by way of the output driver stage based on signals from the switch circuit.

In one or more embodiments, there is a change between driving the transistor circuit based on signals from the amplifier circuit and from the switch circuit. The driving operations by the amplifier circuit and the switch circuit therefore preferably never take place at the same time, but rather alternate according to set specifications. Metered or controlled feedback of energy into the on-board power system is thereby possible. In one or more embodiments of the method, the transistor circuit, the amplifier circuit and/or the switch circuit are monitored by way of the monitoring circuit.

In one or more embodiments, the polarity reversal protection arrangement is operated in a decoupling mode, wherein, at a particular time, either the amplifier circuit or the switch circuit is active and in the process drives the transistor circuit, wherein the respectively inactive circuit (amplifier circuit or switch circuit) guarantees a high impedance at the node point. For this purpose, the respective circuit is disconnected from the quiescent current. This development avoids the two modes interfering with one another.

The method additionally relates to the use of the described polarity reversal protection arrangement in a control unit for a vehicle.

Figure 1:
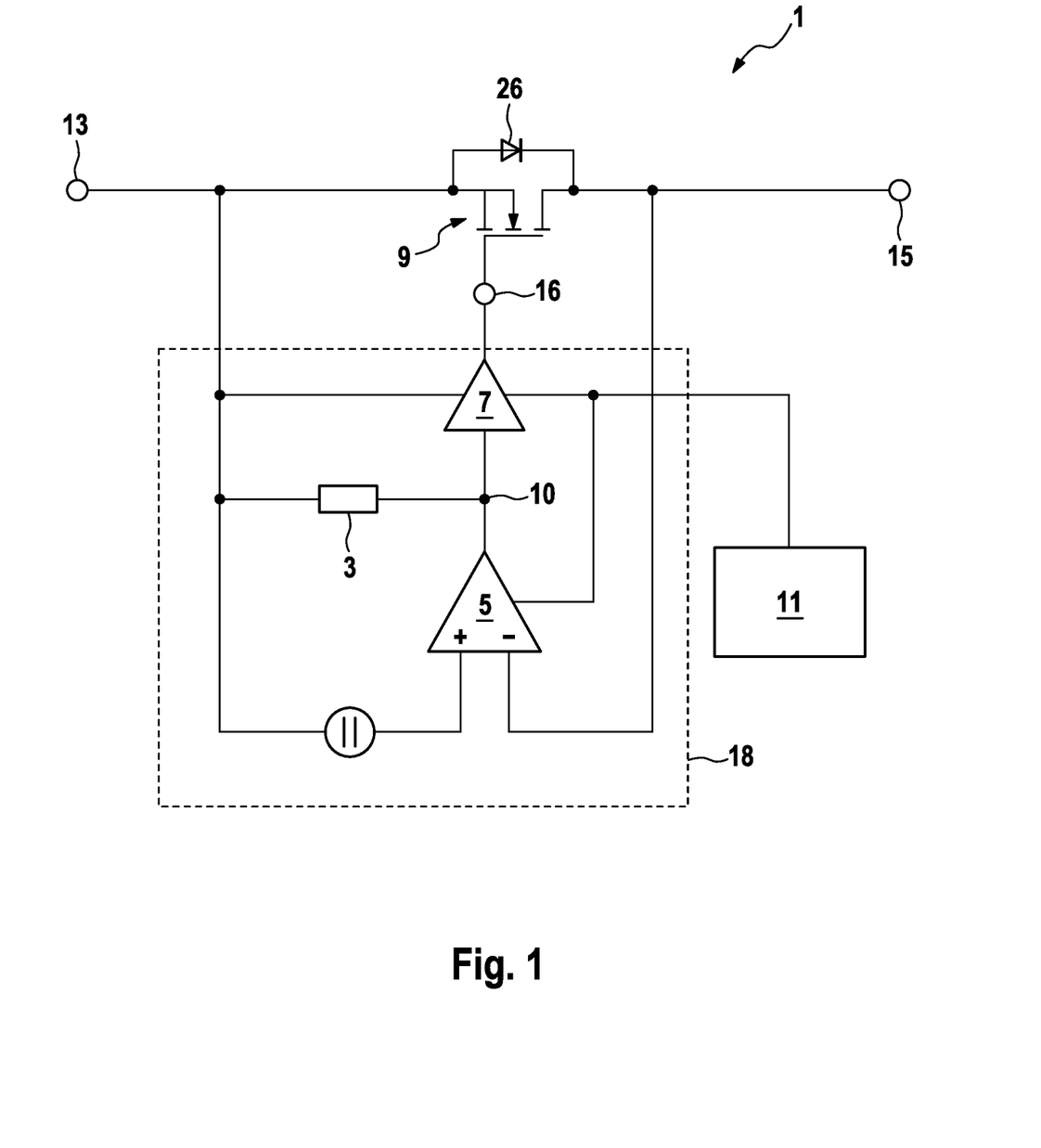
FIG. 1 shows an exemplary implementation of a polarity reversal protection arrangement.

FIG. 1 shows a previous implementation of a polarity reversal protection arrangement 1 having an additional resistor 3. The polarity reversal protection arrangement 1 has an amplifier circuit 5, an output driver stage 7 and a transistor circuit 9. The transistor circuit 9 is designed as an N-MOS transistor. For this reason, the polarity reversal protection arrangement 1 likewise comprises a charge pump 11. As an alternative, the transistor circuit 9 may also be designed as a P-MOS transistor, wherein the charge pump 11 may in this case be dispensed with. The resistor 3 is connected to a node point 10 and to a first connection node 13.

The polarity reversal protection arrangement 1 is arranged between the first connection node 13 and a second connection node 15. The transistor circuit 9 of the polarity reversal protection arrangement 1 is in particular arranged between the first connection node 13 (what is called the KL30 terminal) and the second connection node 15 (what is called the KL30B terminal). The first connection node 13 is connected to an on-board power system of a vehicle. The second connection node 15 is connected to actuators of the vehicle and/or the internal voltage supply of the control device. The transistor circuit 9 is in particular designed such that it is able to create or disconnect a connection between the first connection node 13 and the second connection node 15.

The output driver stage 7 is designed as a tri-state stage. Thus, not only the switch circuit 23 and the test and diagnostic circuit 25 but also other circuits are able to be connected to a third connection node 16 between the output driver stage 7 and the transistor circuit 9.

The combination of output driver stage 7, amplifier circuit 5 and resistor 3 may be referred to as controller circuit 18. The transistor circuit 9 is driven by the amplifier circuit 5 indirectly via the output driver stage 7 or directly by the controller circuit 18. The transistor circuit 9 may likewise be driven directly by the switch circuit 13.

Figure 2:
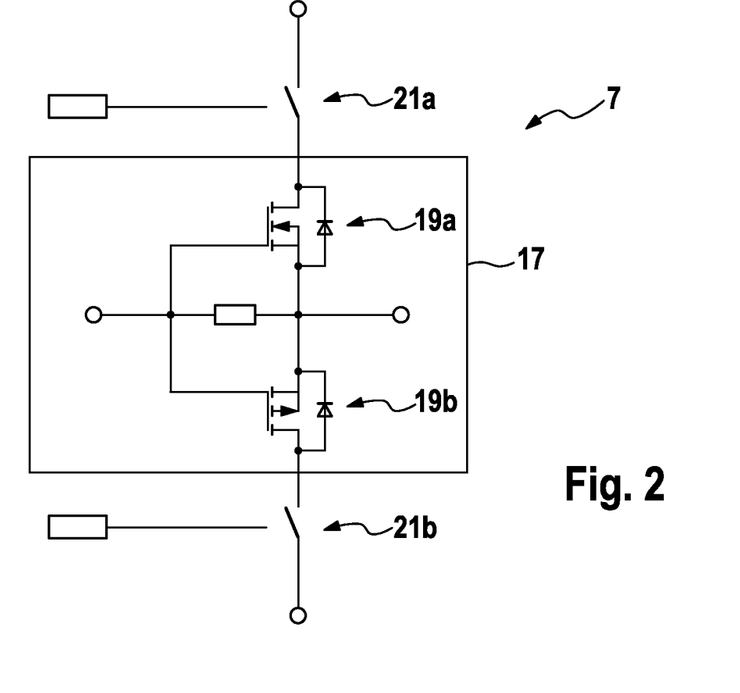
FIG. 2 shows an exemplary embodiment according to the invention of the output driver stage.
Figure 3:
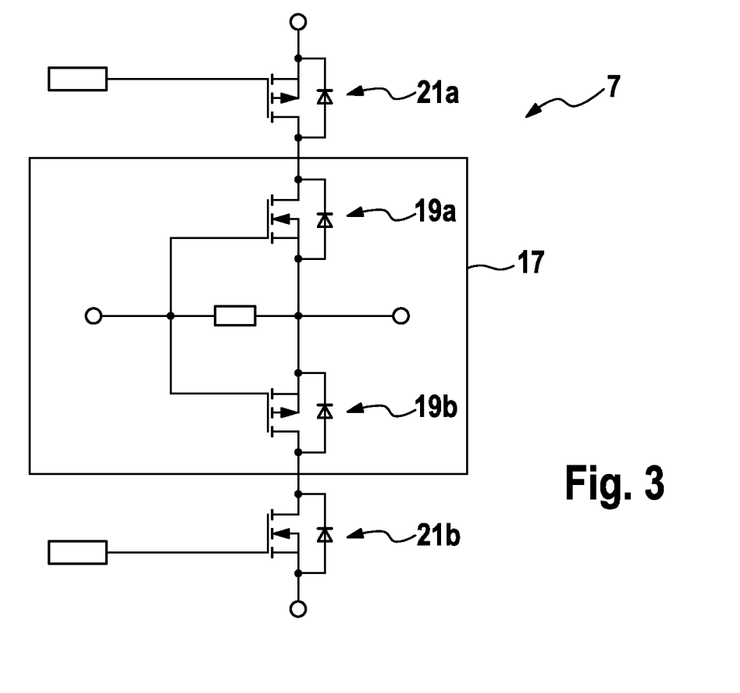
FIG. 3 shows a further exemplary embodiment according to the invention of the output driver stage.

FIG. 2 shows an exemplary embodiment of the output driver stage 7 as a tri-state stage. In this case, the output driver stage 7 has the actual output driver circuit 17 with two MOSFETs 19a, b, and additionally two switches 21a, b. These two switches 21a, b may likewise be designed as MOSFETs, as illustrated in FIG. 3.

The switches 21a, b, in combination with the output driver circuit 17, result in a tri-state stage. The switches 21a, b cause the output of the output driver stage 7 to become high-resistance or have high impedances, for which reason it becomes possible to change between driving the transistor circuit 9 by way of the amplifier circuit 5 and driving a further circuit. The implementation options for the controller circuit 18 here expressly relate not only to the provision of MOSFETs, but also comprise any type of active component able to act as switch or amplifier. These also include for example bipolar transistors or junction FETs, etc.

Figure 4:
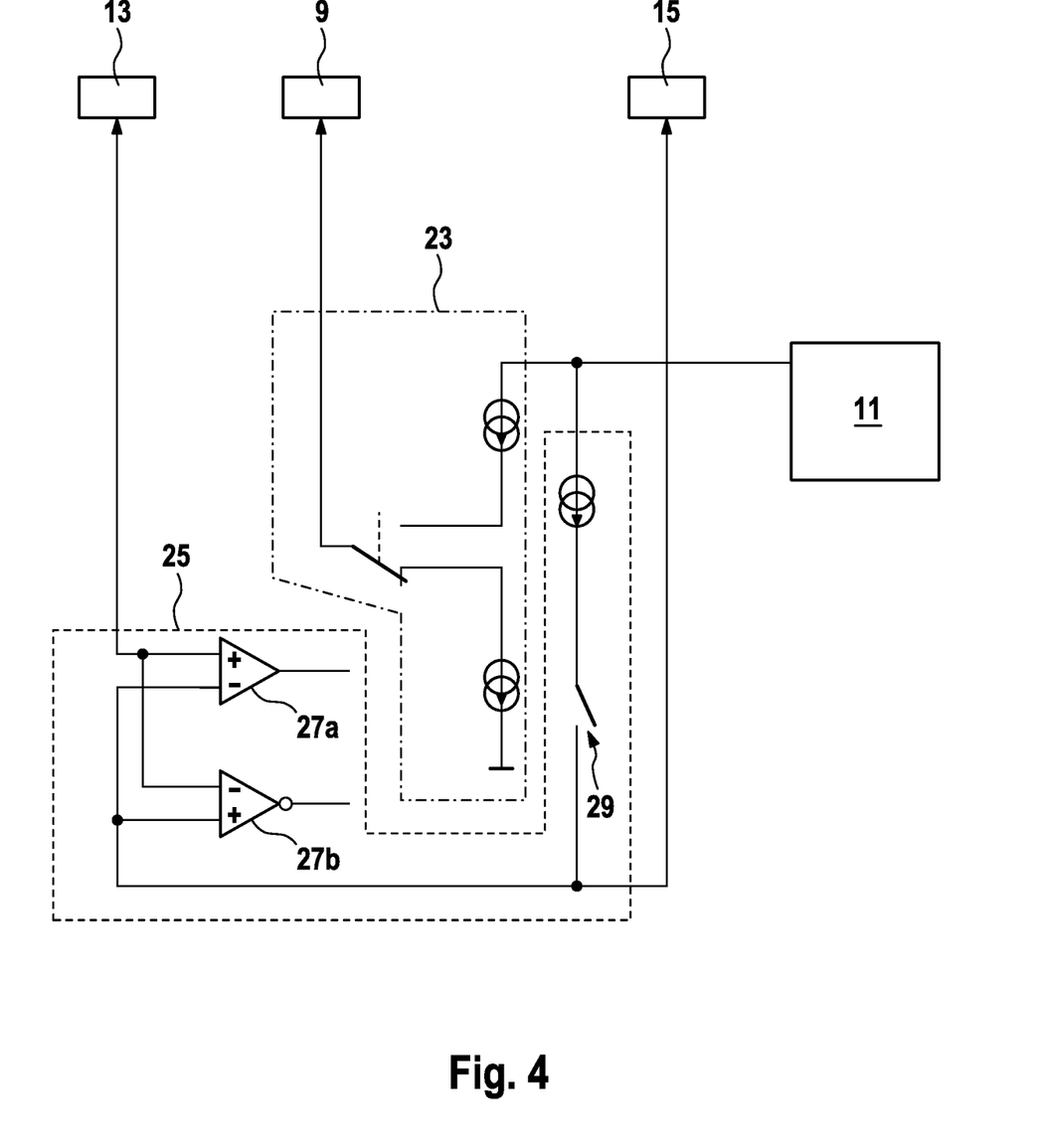
FIG. 4 shows an exemplary embodiment of a switch circuit.

FIG. 4 shows an exemplary embodiment of a switch circuit 23 (dot-and-dash line) and a monitoring circuit 25 (dashed line), which—possibly in modified form are able to be connected, as further circuits, to the third connection node 16 between the output driver stage 7 and the transistor circuit 9. The amplifier circuit 5 or the controller circuit 18 and the switch circuit 23 are both suitable for driving the transistor circuit 9 in different modes and thus for bringing about a differently configured disconnection or creation of the connection between the first connection node 13 and the second connection node 15.

The embodiment of FIG. 4 shows a conventional switch circuit 23 that has been used alone in the prior art up until now, without providing a controller circuit 18, in order to drive the transistor circuit 9. This switch circuit 23 is therefore connected both to the first connection node 13 and the second connection node 15 and to the transistor circuit 9. The switch circuit 23 has a charge pump 11. In addition, the monitoring circuit 25, which is able to monitor the correct operation of the switch circuit 23, is already provided together with conventional switch circuits 23 in a common component. For this purpose, the monitoring circuit 25 has a plurality of operational amplifiers 27a, b and a switch 29.

Figure 5:
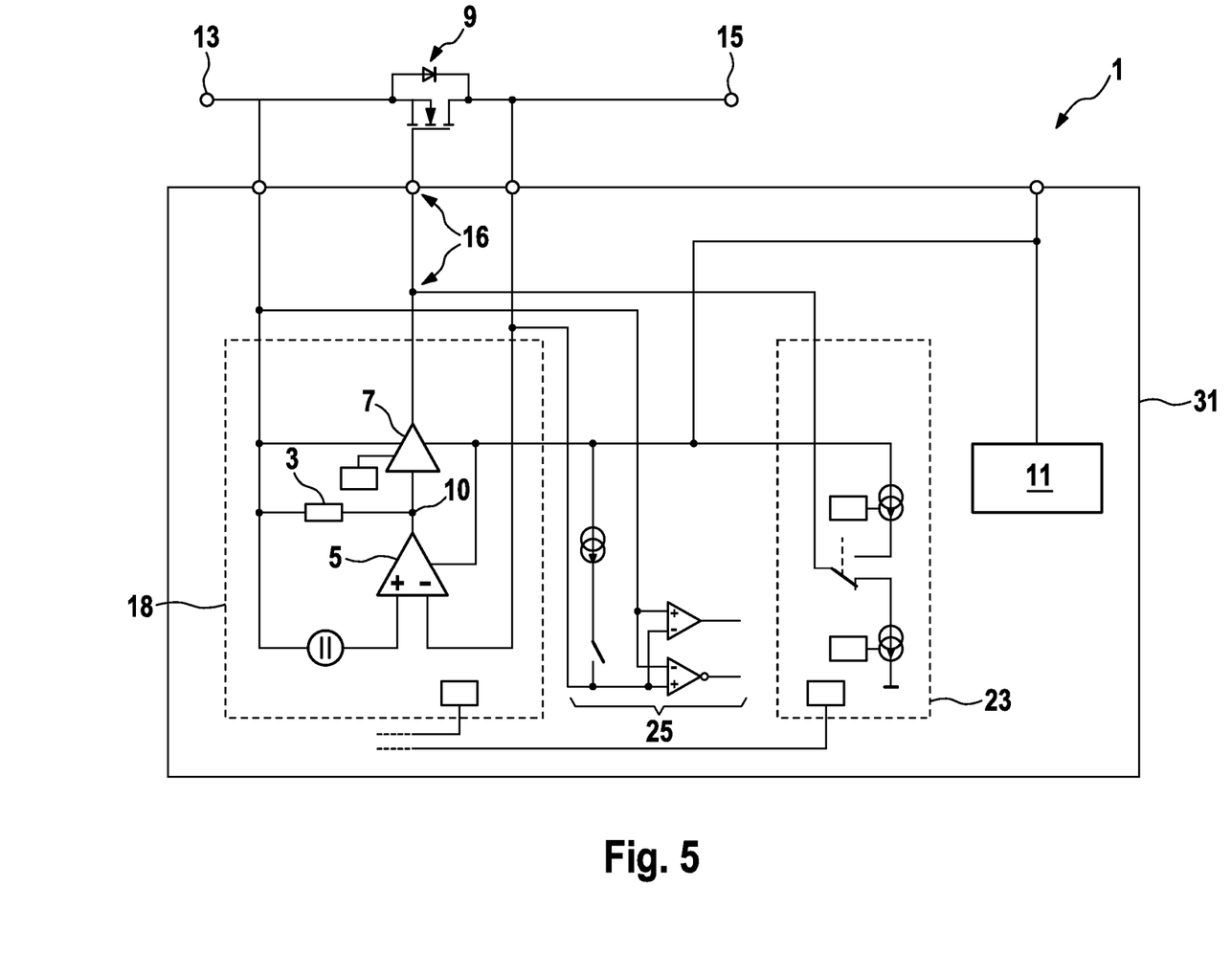
FIG. 5 shows an exemplary embodiment of the polarity reversal protection arrangement with an amplifier circuit and switch circuit.

FIG. 5 shows an exemplary polarity reversal protection arrangement 1 according to the invention having an amplifier circuit 5 and a switch circuit 23, wherein the monitoring circuit 25 is connected such that it is possible to monitor the transistor circuit 9, the amplifier circuit 5 or the controller circuit 18 and the switch circuit 23.

The monitoring circuit 25 is designed to make the following functions feasible:
a. Test function as to whether transistor circuit (9) is able to be switched on/off and
b. Test function as to whether the bulk diode 26 of the transistor circuit (9) is present.

Further test and monitoring functions are conceivable and are supported or made possible by the embodiments.

All of the components that are shown within the border 31 are accommodated in an ASIC, whereas the transistor circuit 9 and the two connection nodes 13, 15 are arranged in another part of a control unit of the vehicle. However, the embodiments are not restricted to such an arrangement within an ASIC, but rather may also be constructed discretely outside an ASIC.

The switch circuit 23 and the monitoring circuit 25 are connected to the gate of the transistor circuit 9 via the third connection node 16, such that they are able to control the operation of the transistor circuit 9. Reference numeral 16 here points to various points, which however all represent the third connection node 16, since the same voltage is present everywhere.

The amplifier circuit 5 or controller circuit 18 and the switch circuit 23 are operated such that they alternately drive the transistor circuit 9. This alternately disconnects/creates the connection between the first connection node 13 and the second connection node 15 based on the two different modes. This advantageously makes it possible to carry out metered feedback of energy into the on-board power system.

LIST OF REFERENCE SIGNS

1 polarity reversal protection arrangement
3 resistor
5 amplifier circuit
7 output driver stage
9 transistor circuit
10 node point
11 charge pump
13 first connection node
15 second connection node
16 third connection node
17 output driver circuit
18 controller circuit
19a,b MOSFETs of the output driver circuit
21a,b switches/MOSFETs of the output driver stage
23 switch circuit
25 monitoring circuit
26 bulk diode of the transistor circuit
27a,b operational amplifiers of the monitoring circuit
29 switch of the monitoring circuit
31 border

The invention claimed is:

1. A polarity reversal protection arrangement comprising:
a transistor circuit;
an amplifier circuit;
an output driver stage;
a first connection node coupled to a source of the transistor circuit;
a second connection node coupled to a drain of the transistor circuit,
a third connection node coupled between a sate of the transistor circuit and an output of the output driver stage; and
a switch circuit coupled to the third connection node,
wherein the transistor circuit is selectively driven by the amplifier circuit and the switch circuit via the output driver stage,
wherein an output of the amplifier circuit is connected to an input of the output driver stage, and
wherein the output driver stage comprises:
a first MO SFET;
a second MOSFET, wherein a source of the first MOSFET is connected to a drain of the second MOSFET;
a first switch connected to a drain of the first MOSFET; and
a second switch connected to a source of the second MOSFET.

2. The polarity reversal protection arrangement as claimed in claim 1, further comprising:
   a node point arranged between the amplifier circuit and the output driver stage; and
   a resistor connected between the node point and to the first connection node.

3. The polarity reversal protection arrangement as claimed in claim 1, further comprising:
   a charge pump connected to the output driver stage, wherein the transistor circuit is designed as an N-MOS transistor.

4. The polarity reversal protection arrangement as claimed in claim 1, further comprising:
   a monitoring circuit configured to monitor the transistor circuit, the amplifier circuit and the switch circuit.

5. The polarity reversal protection arrangement as claimed in claim 2, further comprising:
   a monitoring circuit configured to monitor the transistor circuit, the amplifier circuit and the switch circuit.

6. The polarity reversal protection arrangement as claimed in claim 3, further comprising:
   a monitoring circuit configured to monitor the transistor circuit, the amplifier circuit and the switch circuit.

7. A polarity reversal protection arrangement comprising:
   a transistor circuit;
   an amplifier circuit;
   an output driver stage;
   a first connection node coupled to a source of the transistor circuit; and
   a second connection node coupled to a drain of the transistor circuit,
   wherein an output of the amplifier circuit is connected to an input of the output driver stage and an output of the output driver stage is connected to a gate of the transistor circuit, and
   wherein the output driver stage comprises:
   a first N-MOS transistor;
   a first P-MOS transistor, wherein a drain of the first P-MOS transistor is connected to a drain of the first N-MOS transistor;
   a second P-MOS transistor, wherein a source of the second P-MOS transistor is connected to a source of the first N-MOS transistor; and
   a second N-MOS transistor, wherein a drain of the second N-MOS transistor is connected to a drain of the first P-MOS transistor.

8. The polarity reversal protection arrangement as claimed in claim 7, further comprising:
   a node point arranged between the amplifier circuit and the output driver stage; and
   a resistor connected between the node point and to the first connection node.

9. The polarity reversal protection arrangement as claimed in claim 7, further comprising:
   a charge pump connected to the output driver stage, wherein the transistor circuit is designed as an N-MOS transistor.

10. The polarity reversal protection arrangement as claimed in claim 7, further comprising a switch circuit coupled to the gate of the transistor circuit, the switch circuit configured to control operation of the transistor circuit; and
    a monitoring circuit configured to monitor the transistor circuit, the amplifier circuit and the switch circuit.

11. The polarity reversal protection arrangement as claimed in claim 8, further comprising a switch circuit coupled to the gate of the transistor circuit, the switch circuit configured to control operation of the transistor circuit:
    a monitoring circuit configured to monitor the transistor circuit, the amplifier circuit and the switch circuit.

12. The polarity reversal protection arrangement as claimed in claim 9, further comprising a switch circuit coupled to the gate of the transistor circuit, the switch circuit configured to control operation of the transistor circuit:
    a monitoring circuit configured to monitor the transistor circuit, the amplifier circuit and the switch circuit.

\* \* \* \* \*